(12) United States Patent  
Meyer

(10) Patent No.: US 6,826,326 B1
(45) Date of Patent: Nov. 30, 2004

(54) QUASI-HITLESS TUNABLE ADD-DROP FILTERS

(75) Inventor: A. Douglas Meyer, Woodland Hills, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 79 days.

(21) Appl. No.: 10/286,484

(22) Filed: Nov. 1, 2002

(51) Int. Cl.[7] .................................................. G02B 6/28
(52) U.S. Cl. ........................... 385/24; 385/15; 385/31; 385/37; 385/39; 398/79; 398/83; 398/84; 398/85
(58) Field of Search ............................. 385/15, 24, 31, 385/37, 39; 398/79, 83–85

(56) References Cited

U.S. PATENT DOCUMENTS

| | | | | |
|---|---|---|---|---|
| 5,841,918 A | * | 11/1998 | Li .................................. | 385/24 |
| 5,982,518 A | | 11/1999 | Mizrahi ......................... | 398/84 |
| 6,108,469 A | * | 8/2000 | Chen ............................. | 385/24 |
| 6,122,096 A | | 9/2000 | Fatchi ........................... | 359/341 |
| 6,728,445 B2 | * | 4/2004 | Blomquist et al. ............. | 385/37 |
| 6,738,543 B1 | * | 5/2004 | Beeson et al. ................. | 385/27 |
| 2002/0067526 A1 | * | 6/2002 | Park et al. ..................... | 359/127 |
| 2002/0196495 A1 | * | 12/2002 | Grasso et al. ................. | 359/127 |
| 2003/0185509 A1 | * | 10/2003 | Bailey et al. .................. | 385/37 |

* cited by examiner

*Primary Examiner*—Brian Healy
*Assistant Examiner*—Daniel Petkovsek
(74) *Attorney, Agent, or Firm*—Joe Zheng

(57) ABSTRACT

In tunable systems, during a tuning cycle, express channels or wavelengths are dropped as the system sweeps through its free spectral range (FSR) before stopping at the desired wavelength to be dropped. This is disadvantageous as the data information in the express wavelengths suffers a hit or momentary increase in bit error rate (BER). Techniques for eliminating or at least minimizing interference to those channels or wavelengths are disclosed. According to one aspect of the present invention, the wavelength selection to be dropped is done "off-line" and does not affect the express channels. An optical reference source is used to set up and tune a drop filter. Once the filter is set to the appropriate dropping wavelength, a secondary filter is scanned to cause the channels to be shunted to the drop filter. If the wavelength of a signal and the drop filter matches, the signal is dropped. If the wavelength of the signal and the drop filter wavelength do not matches, the signal passes and is recombined with the other express channels.

17 Claims, 8 Drawing Sheets

QUASI-HITLESS TUNABLE ADD-DROP FILTERS

BACKGROUND OF THE INVENTION

1. Field of the Invention

The invention is generally related to the area of optical data communications, and more particularly, related to add/drop optical devices or subsystems.

2. The Background of Related Art

The future communication networks demand ever increasing bandwidths and flexibility to different communication protocols. Fiber optic networks are becoming increasingly popular for data transmission due to their high speed, high capacity capabilities. Wavelength division multiplexing (WDM) is a technology that puts data from different sources together on an optical fiber with each signal carried at the same time on its own separate light wavelength. Using the WDM system, up to 80 (and theoretically more) separate wavelengths or channels of data can be multiplexed into a light stream transmitted on a single optical fiber. To take the benefits and advantages offered by the WDM system, there require many sophisticated optical network elements.

A tunable WDM add/drop system is one of such elements that are designed to add or drop one or more specific wavelengths or channel signals. In a fiber optic network, there are cases of exchanging wavelengths among optical signals on "loops" within networks. The exchanges occur at points where two or more loops intersect for the purpose of exchanging wavelengths. In particular, the exchanging of data signals involves the exchanging of matching wavelengths from two different loops within an optical network. In other words, a signal would drop a wavelength to the other loop while simultaneously adding the matching wavelength from the other loop. The adding and dropping of wavelengths often occur together. Each wavelength is commonly referred to as a channel or data channel. A tunable WDM add/drop system exists at the points to facilitate these exchanges.

In general, tunable WDM add/drop systems often utilize fixed or tunable fiber Bragg gratings to provide the necessary wavelength selectivity for the add/drop function. To add or drop a specific wavelength, the accurate control of the signal at an absolute wavelength is of high requirement. Any deficient design in the tuning wavelength accuracy could lead to problems that include optical cross talk, signal fluctuation and numerous other undesirable effects. These problems could be compounded if additional channels are added or dropped as part of a service upgrade. Specifically, add/drop devices in a typical optical communications system are designed to accommodate a predetermined number of channels for adding and dropping, because the losses associated with adding and dropping must be accounted for in each of the output paths of the add/drop system. Hence, more loss could be introduced as more channels are added and dropped.

There have been many efforts in design absolute wavelength selectivity. One exemplary technology is to fabricate wavelength selective elements based on recording an index of refraction grating in the core of an optical fiber, for instance, disclosed in U.S. Pat. No. 4,474,427 to Hill et al. and U.S. Pat. No. 4,725,110 to Glenn et al. However, there are many considerations with absolute wavelength selectivity. The cost and complexity elevate considerably when the requirement on the wavelength selectivity is stringent. There is thus a need for techniques that lead to efficient designs of add/drop devices without compromising performance thereof.

On the other hand, in most tunable systems, during a tuning cycle, express channels or wavelengths (i.e., the channels or wavelengths not to be dropped) are dropped as the system sweeps through its free spectral range (FSR) before stopping at the desired wavelength to be dropped. This is disadvantageous as the data information in the express wavelengths suffers a hit or momentary increase in bit error rate (BER), thus there is another need for techniques that eliminate or at least minimize such effects that occurs on the express channels during the tuning cycle.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention pertains to methods and apparatus for adding and dropping a desired channel or wavelength by calibrating optical tunable devices precisely for the desired wavelength. According to one aspect of the present invention, an optical path is formed and includes two tunable devices and a circulator coupled between the two tunable devices so as to prevent possible interference to channels and wavelengths passing through the two tunable devices. A small portion of a dropped signal is used as a reference signal to be introduced into the optical path. A reflected signal of the reference signal is coupled out of the optical path for determination of control signals most suitably for the two tunable devices so as to achieve an accurate control over an absolute wavelength of the tunable devices.

According to one embodiment, the reference signal is modulated by frequency modulation. The reflected reference signal is converted to an electrical signal, wherein the electrical signal thus carries a DC component and a FM component. Further the FM modulated reference signal is modulated by amplitude modulation such that the DC component can be lifted above a noise floor and has a better signal-to-noise ratio. According to another embodiment, an optical slope filter is used. The optical slope filter is a linear device and has specific reflectance and transmission characteristics for each wavelength in the passing band thereof. Utilizing the photocurrents from two detectors associated with the optical slope filter, the wavelength of the dropped signal can be determined. If there are any discrepancies with respect to the desired wavelength, the control signals to the tunable filters can be determined accordingly or iteratively in a signal processor controller unit receiving the electrical signal.

The present invention also pertains to methods and apparatus for eliminating or at least minimizing interference to those channels or wavelengths (hereinafter referring to as transmitted or express channels or wavelengths) passing through tunable devices. For most tunable systems, during a tuning cycle, express channels or wavelengths may be dropped as the system sweeps through its free spectral range (FSR) before stopping at the desired wavelength to be dropped. This is disadvantageous as the data information in the express wavelengths suffers a hit or momentary increase in bit error rate (BER). According to one aspect of the present invention, the wavelength selection to be dropped is done "off-line" and does not affect the express channels.

According to one embodiment of the present invention, two individual optical blocks are used to provide two individual optical paths. The two individual optical blocks are configured to maintain one path active while the other is in stand-by setup or tuning mode. While one optical path is adding and dropping a wavelength, the other optical path can be calibrated for a new wavelength. When an optical switch switches from one path to another, a new wavelength to be added and dropped is effectuated.

There are many benefits, advantages and features in the present invention. One of them is to achieve the stringent requirement on accurate controls over an absolute wavelength commonly used in the tunable devices.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The present invention pertains to fiber optical add/drop systems or devices by calibrating optical tunable devices precisely for the desired wavelength. There are many aspects in the present invention. These aspects include, but not limited to, precisely control of tunable devices by reintroducing a reference derived from a dropped signal for determination of control signals most suitably for the tunable devices so as to achieve an accurate control over an absolute wavelength of the tunable devices, eliminate or minimize undesirable effects on the channels or wavelengths that are not to be added or added and switch different wavelengths to be added/dropped.

The detailed description of the present invention is presented largely in terms of procedures, steps, logic blocks, processing, or other symbolic representations that directly or indirectly resemble the operations of optical devices or systems coupled to optical networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
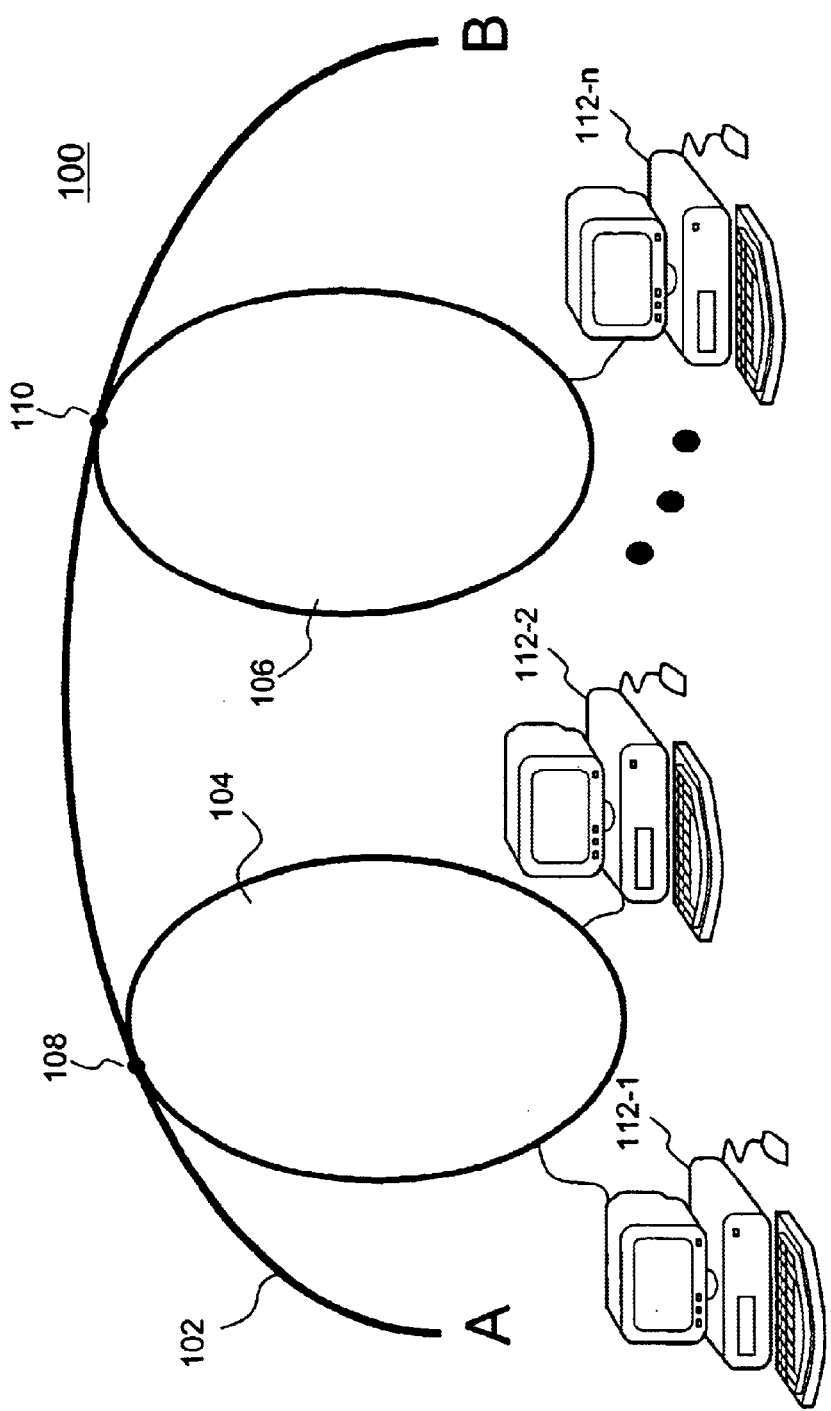
FIG. 1 shows a simplified optical network in which the present invention may be practiced.

Referring now to the drawings, in which like numerals refer to like parts throughout the several views. Referring now to the drawings, in which like numerals refer to like parts throughout the several views. FIG. 1 illustrates a simplified optical network 100 in which the present invention may be practiced. The optical network 100 comprises a main loop 102 connecting two primary locations A and B. Between the two primary locations A and B, there are two local loops 104 and 106 coupled with the main loop 102 at coupling points 108 and 110. When an optical multiplexed signal including multiple channel signals (i.e. individual optical signals at various wavelengths) travels from A to B, the multiplexed signal may add and drop one or more channels from local loop 104 at the coupling point 108. The new signal will continue to travel towards the coupling point 110 where one or more channels are added to and dropped from the signal from local loop 104 at coupling point 110, and eventually to B. Within each local loop 104 and 106, optical signals including the dropped channels may be transmitted to various locations within its loop. Local receivers to convert the optical signals into electronic signals in an appropriate protocol format. Conversely, electronic signals to be transmitted from one or more of the local transmitters may be converted to optical signals (i.e. individual channels) to be added to the signal traveling in the main loop 102 at coupling point 110.

To facilitate the add/drop functions, one or more optical devices, referred to as add/drop subsystem or device, are often needed. A tunable optical filter is often used. A fiber Bragg grating (FBG) is one of the examples of the tunable optical filters and made from a section of ordinary single-mode optical fiber, typically a few millimeters to a few centimeters in length. The grating is formed by causing periodic variations in the index of refraction of the glass lengthwise along the fiber. The period of the index modulation can be designed to cause deflection of light at a specific wavelength, namely the Bragg wavelength. Typically the light at the Bragg wavelength is selectively reflected while all other wavelengths are transmitted, essentially unperturbed by the presence of the grating. To facilitate the description of the present invention, the following is based on embodiments using FBGs. It is understood to those skilled in the art that the description is equally applied when other types of tunable optical filters are employed.

In general, the specific or desired wavelength for a FBG is preferably altered to add/drop other required wavelengths. Thus, a tunable FBG is commonly used. The desired wavelength of a tunable FBG may vary upon the application of an external strain or the application of a change in temperature. As used herein, a signal that is used to apply to a tunable FBG to affect its wavelength selectivity is referred to as a wavelength selectivity control signal, or a control signal. Those skilled in the art will understand that this control signal may be used differently depending upon an exact implementation of a tunable FBG. In one possible case, the control signal is used to calibrate an external electrical potential to control a tunable FBG. In another possible case, the control signal is applied directly to affect the wavelength selectivity in a tunable FBG. In any case, the FBG has a spectrum response of transmission that allows all wavelengths, except for one, to pass through. The one that is not passed is centered at wavelength $\lambda_x$ and be reflected or dropped out.

Figure 2:
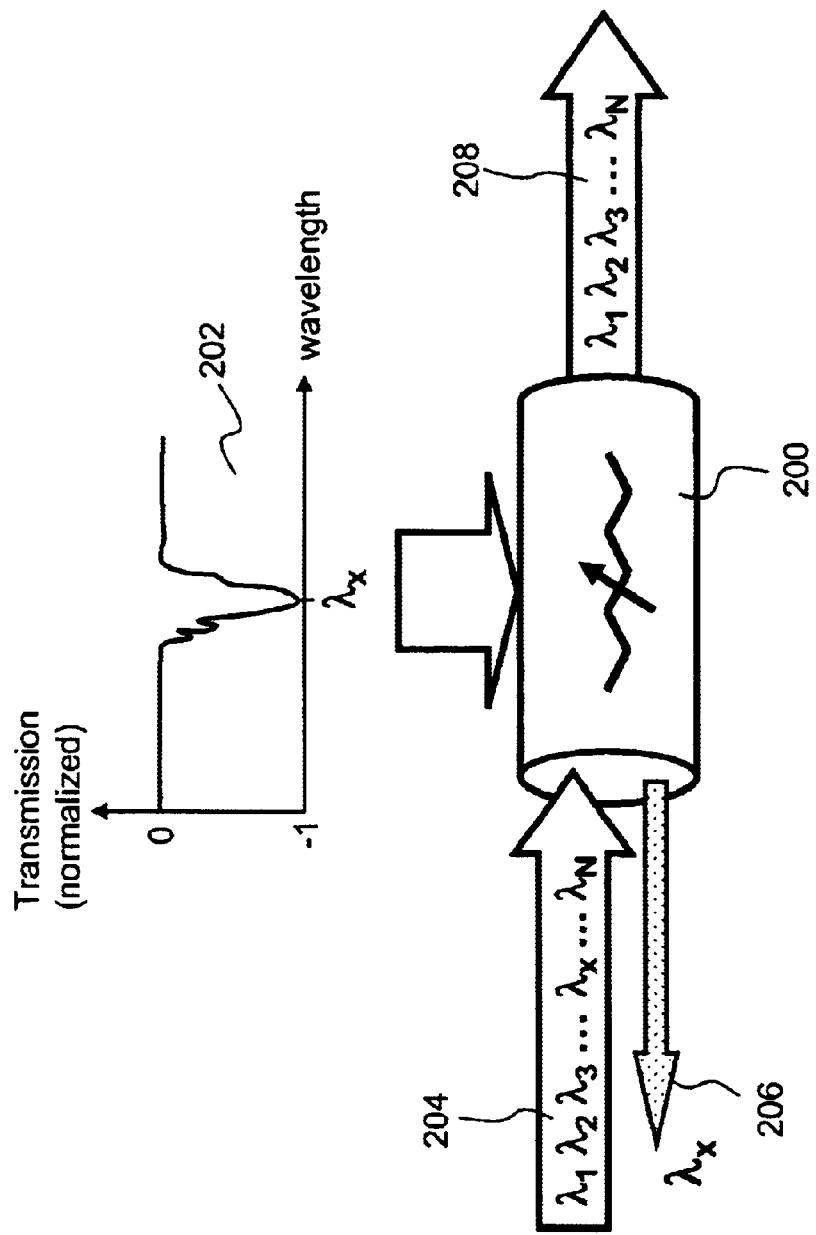
FIG. 2 illustrates graphically a tunable device that "tunes" specifically for a specific wavelength $\lambda_x$ in response to an externally applied control signal.

FIG. 2 illustrates graphically a tunable device 200 (e.g., a FBG) that "tunes" specifically for a specific wavelength $\lambda_x$ in response to an externally applied control signal 202 for the wavelength $\lambda_x$. When a multiplexed optical signal 204 including wavelengths $\lambda_1 \lambda_2 \lambda_3 \ldots \lambda_X \ldots \lambda_K$ is coupled into the tunable device 200, a channel 206 (i.e. wavelength $\lambda_x$) will be reflected from the tunable FBG 200 and the rest of the channels 208 at $\lambda_1 \lambda_2 \lambda_3 \ldots \lambda_K$ (not including $\lambda_x$) will transmit through the tunable FBG 200, wherein K is a finite positive integer and X is between 1 and K. As used herein, the wavelength $\lambda_x$ is referred to as a desired or dropped wavelength while those passing through a tunable device are referred to as transmitted or express wavelengths. Also, a signal with or at a wavelength $\lambda$ and the wavelength $\lambda$ are interchangeably used to facilitate the description of the present invention. Unless specifically stated, a signal with a wavelength $\lambda$ to be added or dropped is equivalent to the wavelength $\lambda$ to be added or dropped. Accordingly, it can be appreciated that the control signal 202 shall be controlled in such a way that the tunable device 200 can be tuned correctly to reflect out a desired wavelength (i.e., $\lambda_x$).

In real applications, any deficient design in the tuning wavelength accuracy could lead to problems that include optical cross talk, signal fluctuation and numerous other undesirable effects. In particular, when there is a small amount offset in the control signal 202 or the response of the FBG to the control signal, a residual of the dropped channel or wavelength $\lambda_x$ will be present in the rest of the channels 208 at $\lambda_1 \lambda_2 \lambda_3 \ldots \lambda_K$ (not including $\lambda_x$). Consequently, the residual will interfere with a newly added wavelength at $\lambda_x$, causing an increase in bit error rate (BER) at a receiving site.

Figure 3:
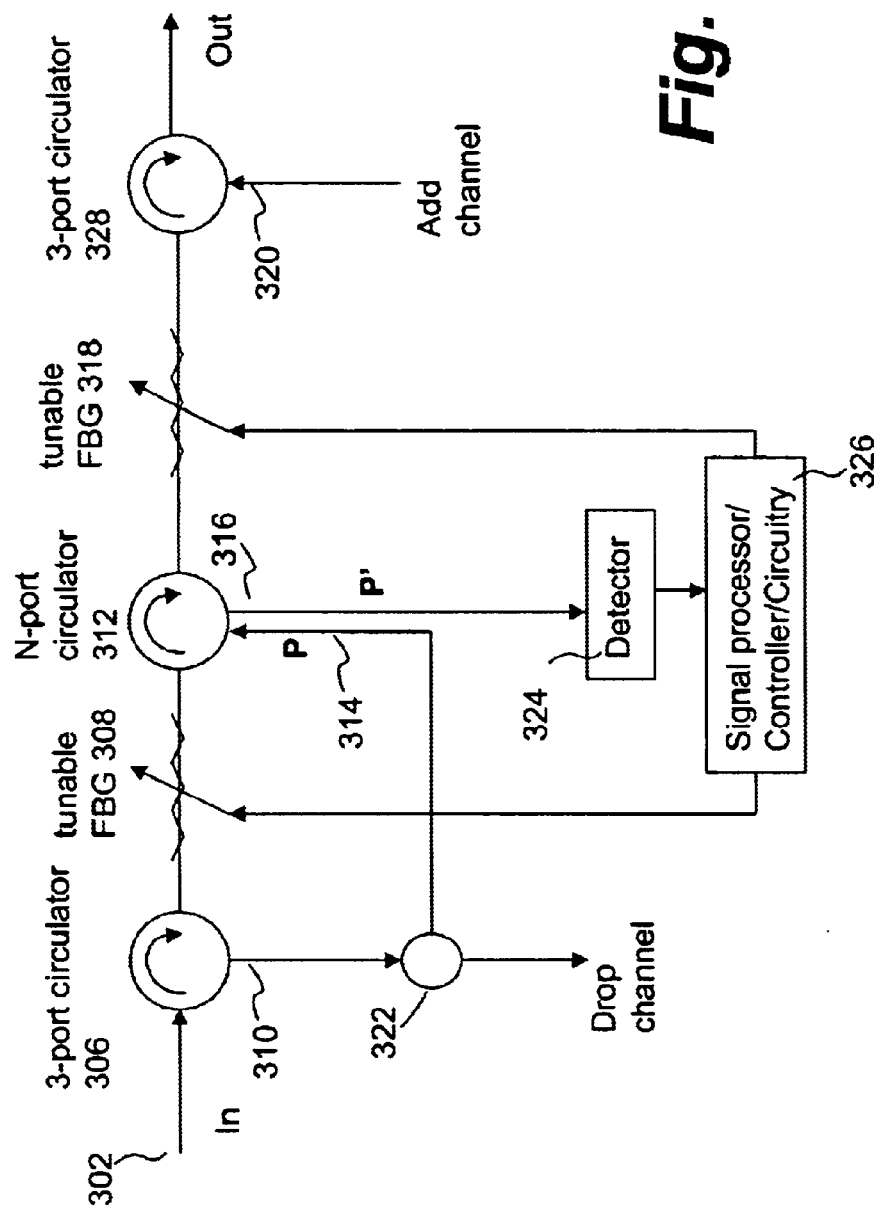
FIG. 3 shows an optical add/drop device employing the present invention according to one embodiment thereof.

Referring to FIG. 3, there is shown an optical add/drop device 300 employing the present invention according to one embodiment thereof. An optical signal 302 including K channels (e.g. $\lambda_1 \lambda_2 \lambda_3 \ldots \lambda_x \ldots \lambda_K$) arrives at an input port of a three-port circulator 306. As the signal 302 travels to a first tunable FBG 308 tuned at wavelength $\lambda_x$ by a control signal from the controller 326324. A channel at wavelength $\lambda_x$ in the signal 302 is then reflected by the first tunable FBG 308 and the rest of the wavelengths in the signal 302 pass through the first tunable FBG 308 and arrive at an input port of an N-port circulator 312, where N is at least 4. The reflected wavelength $\lambda_x$ is dropped out from the signal 302 through a port 310 of the three-port circulator 308.

The output of the first tunable FBG 308, namely, the transmitted signal including the rest of the wavelengths in the signal 302 passing through the first tunable FBG 308, is now coupled to the N-port circulator 312 that routes the transmitted signal to the second FBG 318. It is assumed that both of the first and second FBG 308 and 318 are tuned nominally equal, the transmitted signal goes through the second FBG 318. In passing through a three-port circulator 328, the rest of the wavelengths in the signal 302 picks up a wavelength $\lambda_x$ added from a port 320 of the three-port circulator 328, as such, the add/drop process or multiplexing/demultiplexing process has completed.

If either one of the FBG 308 or 318 is not tuned properly, a residual of the dropped channel or wavelength $\lambda_x$ would be present in the transmitted wavelengths. Consequently, the residual will interfere with a newly added wavelength from the port 320, causing an increase in bit error rate (BER). By virtue of the present invention, a reference signal is introduced to a negative feedback loop formed to maximize a reflection of the reference signal by adjusting the FBG 308 or 318 in accordance with the desired wavelength. As shown in the figure, a coupler 322 is coupled to the drop port 310 of the three-port circulator 308. As the dropped channel signal comes out of the three-port circulator 308, the coupler 322 taps off a small portion of the dropped channel signal (e.g., 1~5%). The tapped signal is introduced through a port 314 of the N-port circulator 312. As a result, the tapped signal is reflected back by both of the first and second tunable FBGs 308 and 318 and eventually comes out from another port 316 of the N-port circulator 312. The reflected signal of the tapped signal is converted by an optic-to-electronic conversion device 324 (e.g., a photodiode) to an electronic signal that is coupled to a signal processor or circuitry 326.

Without the loss of generality, it may be assumed that $P(\lambda_x)$ represents the power of the tapped signal and $P'(\lambda_x)$ represents the power of the reflected signal, namely the tapped signal, after injected into the N-port circulator 312, is reflected by the first and/or second tunable FBG 308 and 318. In essence, a feedback control loop or system is used to maximize $P'(\lambda_x)$, which supports the fact that both of the first and second tunable FBG 308 and 318 shall be tuned precisely for the desired wavelength $\lambda_x$ such that the tapped signal $P(\lambda_x)$ is completely reflected by the first and second tunable FBG 308 and 318.

As will be further appreciated, one of the features in the present invention is to generate control signals to precisely control the FBG used in the device 300 by adjusting the control signals in accordance with the reflected tapped signal being maximized. To maximize $P'(\lambda_x)$, the signal processor 326 can be configured to analyze $P'(\lambda_x)$, and provide adjustments to or generate the control signals being used for both tunable FBGs 308 and 318. Iteratively and subsequently, the $P'(\lambda_x)$ can be maximized.

Regarding the signal processor 326, there are a number of ways to implement the signal processor 326. One possible way is to utilize a digital signal processor (DSP) that is programmed to generate the adjustments to or the control signals for both tunable FBGs 308 and 318 that can subsequently maximize the power of $P'(\lambda_x)$. Those skilled in the art may appreciate that the same functions may be achieved in dedicated circuitry to be used in 326.

To view the device 300 from a different perspective, a negative feedback closed-loop is in place. The negative feedback closed-loop includes the coupler 322 that taps a portion of the dropped signal, the N-port circulator 312 that introduces the tapped signal back to both tunable FBGs 308 and 318 and the signal processor 324 that eventually produces the control signals most suitably for the tunable FBGs. In other words, both of the control signals for the tunable FBGs 308 and 318 can be subsequently and precisely adjusted for the wavelength $\lambda_x$. As a result, the wavelength to be dropped out from the port 310 of the three-port circulator 306 or added to the port 320 of the three-port circulator 328 can be precisely set at $\lambda_x$.

It should be noted that the tunable FBGs 308 and 318 used in FIG. 3 are based on one embodiment. Those skilled in that art can appreciate by now that the features, benefits and advantages may be applied to other tunable optical devices such as thin film filters, acoustical optical filters and tunable Fabry-Perot filter. In essence, an optical path is formed by inserting a circulator between a pair of tunable optical devices, both tuned at the same desired wavelength so as to prevent possible resonant interference to other signals.

Figure 4:
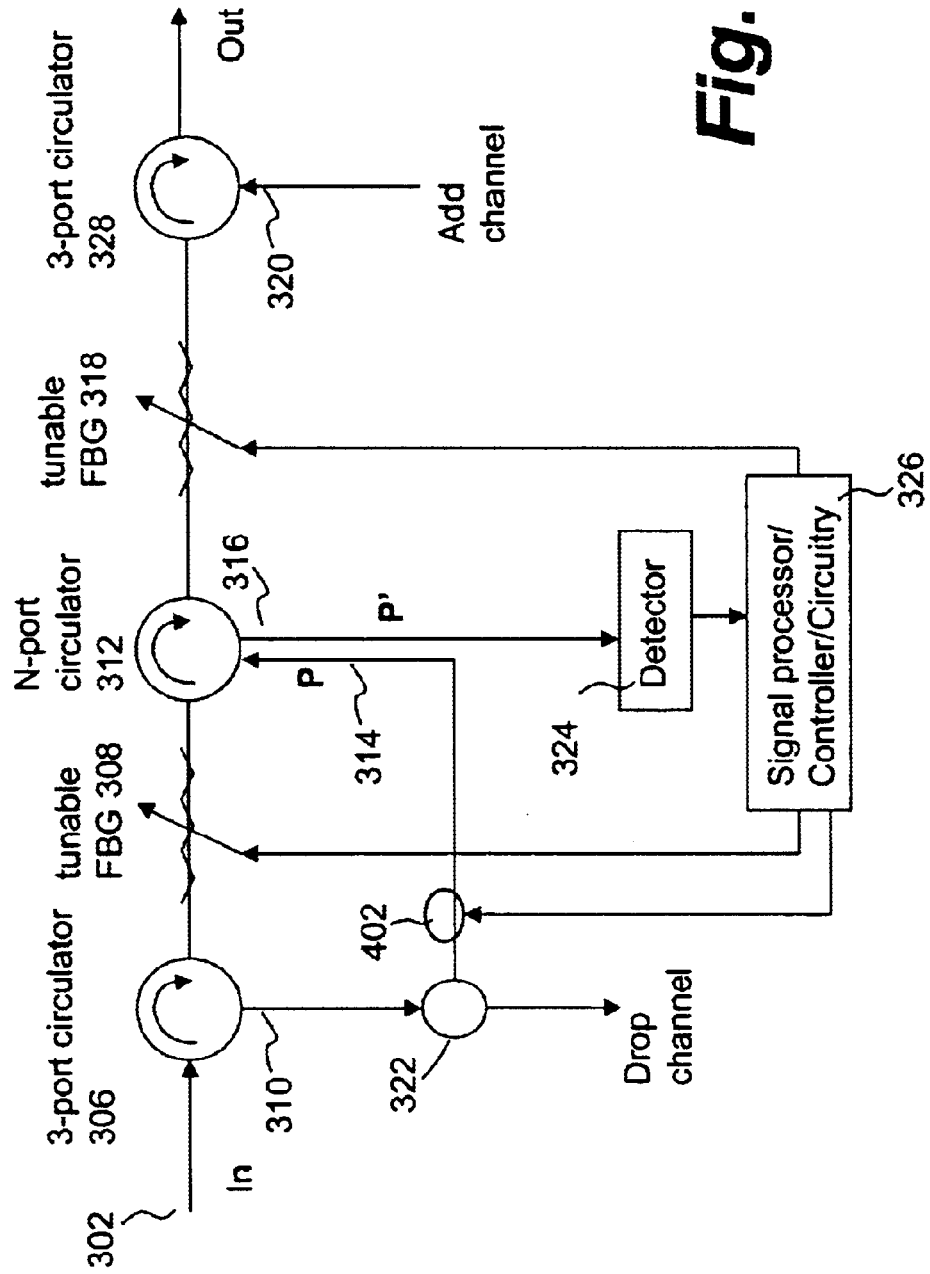
FIG. 4 shows another embodiment based on the configuration of FIG. 3 to introduce the use of a piezo element to modulate signals.

Referring now to FIG. 4, there is shown another embodiment 400 based on the configuration of FIG. 3. The embodiment 400 introduces a piezo element 402. According to one embodiment, a length segment of an optical fiber is wrapped on the element 402 and a modulation frequency is applied to the piezo element 402. As a result, this modulation induces a frequency modulation (FM) in the reference optical signal (i.e., the tapped signal). When detected at the photo detector 324, the resultant (photo) current carries the DC photocurrent as well as the FM signal. Using FM demodulation techniques and a slope detector, the FM is converted to amplitude modulation (AM). Employing this technique has the advantage of straight DC detection as the signal of interest is lifted above the noise floor and better signal to noise ratio can be optioned for small input signals.

Figure 5:
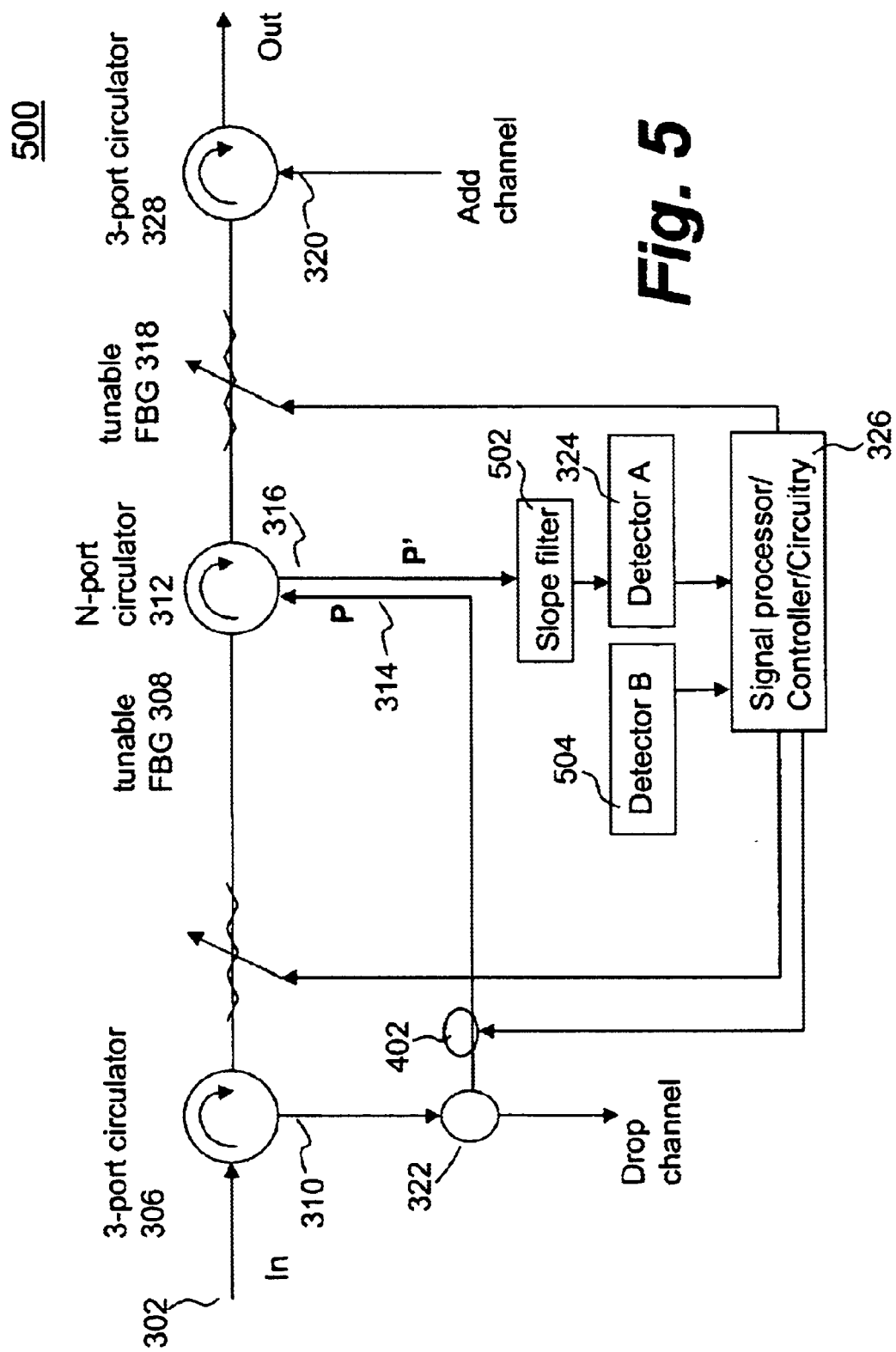
FIG. 5 shows an embodiment based on the configuration of FIG. 3 or FIG. 4, the embodiment introduces an optical slope filter and a second detector.

Referring now to FIG. 5, there is shown an embodiment 500 based on the configuration of FIG. 3 or FIG. 4. The embodiment 500 introduces an optical slope filter 502 and a second detector 504. The optical slope filter 502 is calibrated and has reflectance and transmission values known for each wavelength in its passing band. In operation, the reflected signal $P'(\lambda_x)$, which is modulated due to the tapped signal $P(\lambda_x)$ being modulated by the piezo element 402, outputs from the N-port circulator 312 and is coupled to an optical slope filter 502 and two associated photo detectors 504 and 506. The optical slope filter 502 is a linear device and has specific reflectance and transmission characteristics for each wavelength in the passing band thereof. Utilizing the photocurrents from the two detectors 504 and 506, the wavelength of the dropped signal can be determined. If there are any discrepancies with respect to the desired wavelength, the control signals to the tunable filter 308 and/or 318 can be determined accordingly or iteratively in the signal processor controller unit 326 so as to maximize the dropped portion from the drop port 310 of the 3-port circulator 306.

Consequently, with the first and second electronic signals, the wavelength of a signal (i.e., $P'(\lambda_x)$) can thus be obtained via a lookup table of the optical slope filter 502. It is known that the slope of the slope filter 502 determines the resolution of the subject wavelength. According to one embodiment, the slope filter 502 is chosen with a slightly flatter slope, yielding more spacing between adjacent wavelengths and therefore less ambiguities.

For most tunable systems, during the tuning cycle, the express channels or wavelengths (i.e., the channels or wavelengths not to be dropped) are dropped as the system sweeps through its free spectral range (FSR) before stopping at the desired wavelength to be dropped. This is disadvantageous as the data information in the express wavelengths suffers a hit or momentary increase in bit error rate (BER).

Figure 6:
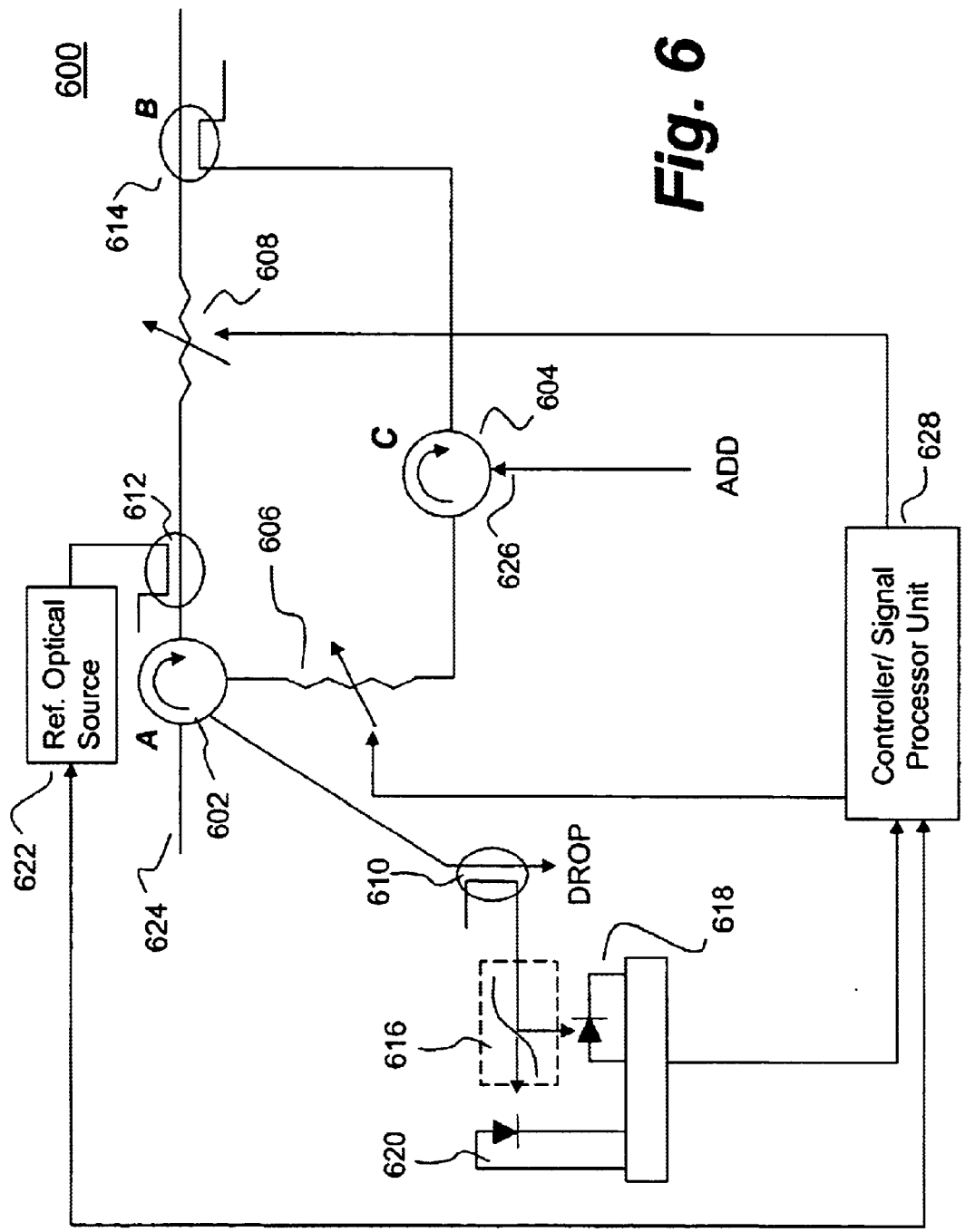
FIG. 6 shows a configuration according to one embodiment of the present invention to eliminate or at least minimize undesirable effects on the channels or wavelengths that are not to be dropped or added.

FIG. 6 shows a configuration 600 according to one embodiment of the present invention to eliminate or at least minimize that hit that occurs on the express channels. One of the features in the present invention is that the wavelength selection is done "off-line" and does not affect the express channels.

The configuration 600 includes a 4-port circulator 602, a 3-port circulator 604, two tunable filters 606 and 608, two optical tap couplers 610 and 612, a power combiner 614, an optical slope filter 616, a pair of photo detectors 618 and 620, and a signal processor controller unit 628. The two tunable filters 608 and 608 are preferably two tunable Fiber Bragg Filters (FBG), but may be any type of optical tunable filter that operates in reflective (for the drop channel wavelngth) and transmission (for the express channels or wavelengths) modes.

It is assumed that a wavelength to be dropped is $\lambda_x$. A reference optical source 622 is tuned to generate a reference signal at the wavelength $\lambda_x$. This reference signal is introduced or injected by the coupler 610 into the circulator 602 that is coupled to the tunable filter 606. In operation, an optical signal 624 including K channels (e.g. $\lambda_1\lambda_2\lambda_3 \ldots \lambda_K$) is coupled into an input port of a three-port circulator 602. The tunable filter 606 is then scanned over a predefined wavelength band, e.g., a wavelength band to include all wavelengths $\lambda_1\lambda_2\lambda_3 \ldots \lambda_x \ldots \lambda_K$ in the optical signal 624. If both of the tunable filters 606 and 608 are tuned precisely, a signal with the wavelength $\lambda_x$ will be dropped out from the circulator 602 and a signal with the wavelength $\lambda_x$ will be added from the circulator 604.

To ensure that both of the tunable filters 606 and 600 are tuned properly, the reference signal from a signal source 622 is coupled into an optical path AB. When the wavelengths of the tunable filter 606 and the reference signal match, the reference signal reflects back by the tunable filter 606 to the circulator 602, the circulator 602 routes the reflected signal to a drop port 626 thereof. The drop port 626 is coupled to the coupler 610 that picks off a portion of the signal dropped from the circulator 602 and couples it to the optical slope filter 616 and two associated photo detectors 618 and 620. The optical slope filter 616 is a linear device and has specific reflectance and transmission characteristics for each wavelength in the passing band thereof. Utilizing the photocurrents from the two detectors 618 and 620, the wavelength of the dropped signal can be determined. If there are any discrepancies with respect to the desired wavelength, the control signal to the tunable filter 608 or an adjustment thereto can be determined accordingly or iteratively in the signal processor controller unit 628 so as to maximize the dropped signal.

Once the primary drop filter, namely the tunable filter 606, has been adjusted, the secondary filter (i.e., tunable filter 608) is scanned over the same wavelength band. During the scanning process, the wavelengths that are express wavelengths will be reflected back to the circulator 602 that will route the wavelengths toward the primary drop filter 606. The express wavelengths pass through the tunable filter 606 as they do not match the filter's wavelength set point and continue and pass through the circulator 604, eventually to a coupler 614 (i.e., a combiner). At this point, the signals are recombined with the remainder of the express channels coming from the tunable filter 608 and are referred to as a resultant or composite signal.

When the signal reflected from the secondary filter matches that of the primary drop filter, the signal is reflected back to the circulator 602 that then routes the signal to the drop port thereof. The signal from the slope filter can be used to make minor tuning adjustments to the primary and secondary filters to maximize the drop signal.

For example, an optical signal 624 including K channels (e.g. $\lambda_1\lambda_2\lambda_3 \ldots \lambda_x \ldots \lambda_K$) is coupled into an input port of a three-port circulator 602. As the tunable filter 606 is being scanned over the FSR, the wavelengths $\lambda_1\lambda_2\lambda_3 \ldots \lambda_{x-1}$ are reflected back to the circulator 602. These express wavelengths pass through the tunable filter 606 as they do not match the wavelength $\lambda_x$ that the tunable filter 606 has been turned for and pass through the circulator 604 while picking up a wavelength $\lambda_x$ to be added. A signal to be added can be introduced from a port 626 of the circulator 604. The signal to be added, generally being the same wavelength that has been dropped, is injected into the port 626 of the circulator 604, and is routed to the tunable filter 606. Since it has the same wavelength as the dropped signal, it is reflected back and passes though the circulator 604 that route the signal to the coupler 614 where it is then added to the express wavelengths $\lambda_1\lambda_2\lambda_3 \ldots \lambda_{x-1}$. At the moment, the output of the three-port circulator 604 outputs the wavelengths $\lambda_1\lambda_2\lambda_3 \ldots \lambda_{x-1}\lambda_x$ and transmits to the combiner 614.

At the same time, the tunable filter 606 is tuned for the wavelength $\lambda_x$, the rest of the wavelength $\lambda_{x+1} \ldots \lambda_K$ passes through the tunable filter 606 and also transmits to the combiner 614, and subsequently, combines with the signal from the circulator 604. As a result, the combiner 614 outputs the wavelengths $\lambda_1\lambda_2\lambda_3 \ldots \lambda_{x-1}\lambda_x\lambda_x \ldots \lambda_K$, completing the adding and dropping function.

According to one embodiment, it is preferable that the two optical path lengths AB and ACB are configured nearly equal, thus keeping the time delay of optical signals in each path nearly identical. As the signals being presented are clocked and time slotted, it is essential to keep the relative positions of the clocked signals the same, which will prevent gaps from being formed in the data payload and ensure that the BER of the system 600 can be maintained during a tuning cycle.

Figure 7:
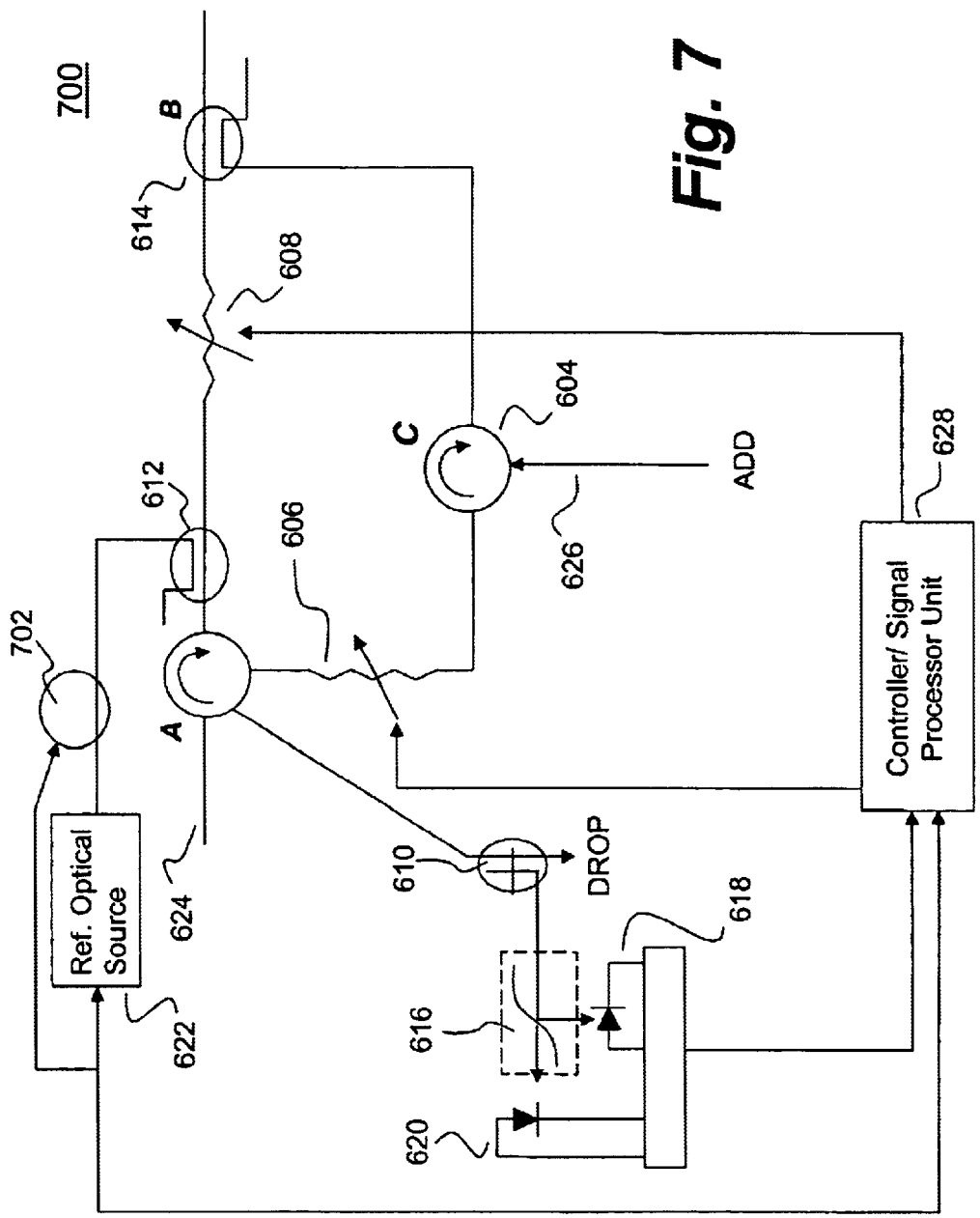
FIG. 7 is based on FIG. 6 and shows a piezoceramic (PZT) element (e.g., coil) is placed on an output of a reference optical source and used to frequency modulate (FM) the reference signal.

According to another embodiment 700 that is shown in FIG. 7, a piezoceramic (PZT) element (e.g., coil) is placed on the output of the reference optical source 622 and used to frequency modulate (FM) the reference signal. Alternatively, the reference optical source can have an FM signal directly applied to the emitting laser. In either case, the FM signal is detected at the photo detectors 618 and 620 and by utilizing FM demodulation techniques and be converted to an amplitude modulation (AM). This has the advantage of increasing the signal to noise ratio of the detected signals, as previously described.

Figure 8:
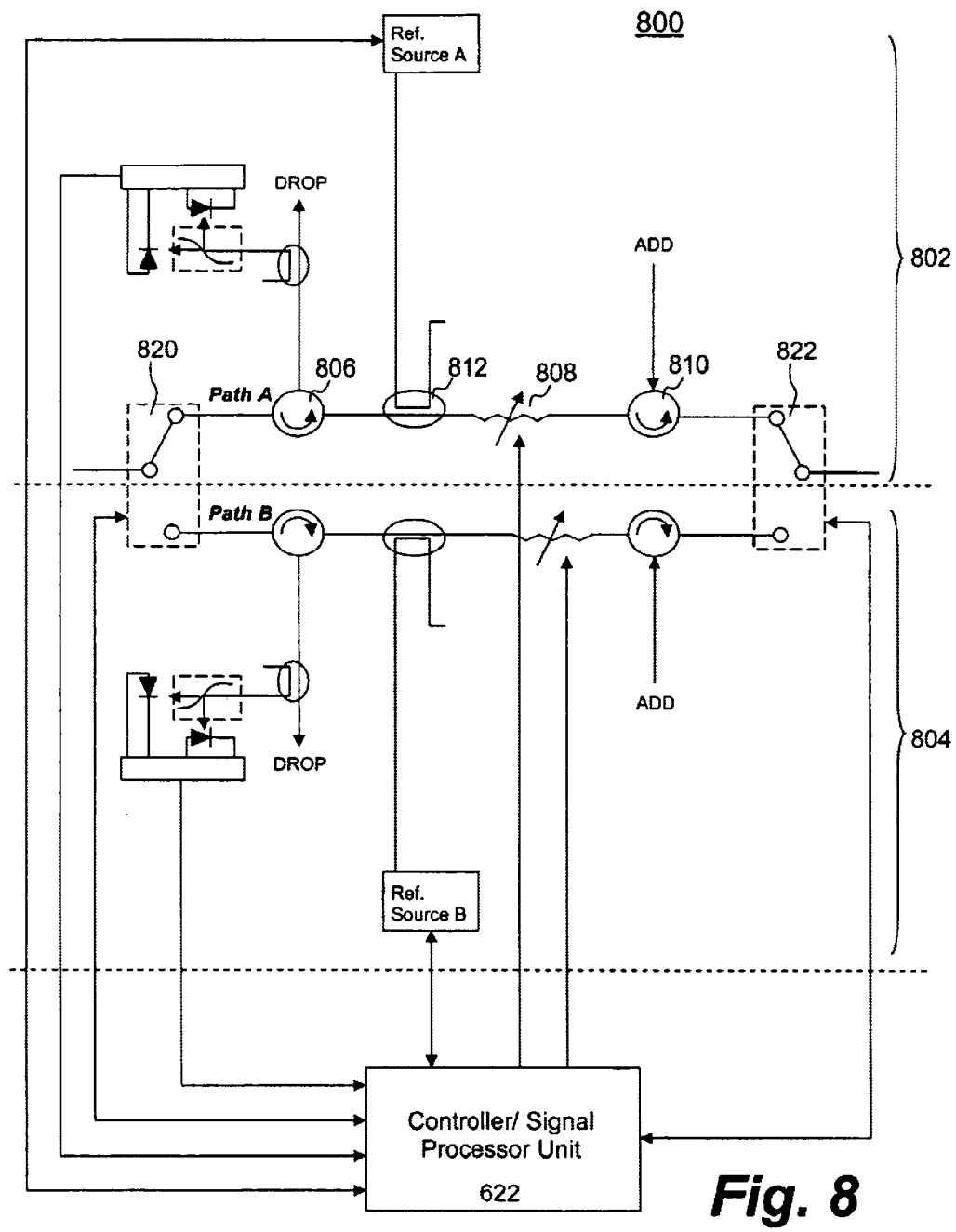
FIG. 8 shows two individual optical paths are being used to add and drop different wavelength or channels, according to one embodiment of the present invention.

Referring now to FIG. 8, there is shown another configuration of an add/drop device employing two independent optical drop paths according to one embodiment of the present invention. Essentially, there are two identical optical in blocks 802 and 804. As far as the optical block 802 is concerned, it includes two circulators 806 and 810, a tunable filter 808 and a coupler 812. A reference signal is introduced into the optical path A by the coupler 812 to facilitate the tuning of the tunable filter 808 to a desired wavelength. A dropped signal from the circulator 806 is sampled, filtered, converted and subsequently measured in the signal proc ssor/circuitry 628. The operation of tuning th tunabl filter 808 has been detailed above and will not be provided again herein to avoid obscuring aspects of the present invention. In any case, an optical signal 624 including K channels or wavelengths $\lambda_1\lambda_2\lambda_3 \ldots \lambda_x \ldots \lambda_K$ is coupled into an input port of a three-port circulator 806, the wavelength $\lambda_x$ is reflected by the tunable filter 808 and the rest of the wavelengths pass through the tunable filter 808. When passing through the circulator 810, a wavelength $\lambda_x$ is picked up. Thus a complete adding and dropping the wavelength $\lambda_x$ is complete.

The optical block 804 has the same operations, except for a different wavelength to add and drop. One of the features in this configuration is that the configuration 800 is configured to maintain one path active while the other is in stand-by setup or tuning mode. While one optical path is adding and dropping a wavelength, the other optical path can be calibrated for a new wavelength. When optical switches 820 and 822 switch simultaneously from one path to another, a new wavelength to be added and dropped is effected. According to one embodiment, the optical switches 820 and 822 have a switching speed measured in a range of millisecond, thus to minimize possible interruption in traffic during the switch over. Generally, the switch speed is dependent on the data rate of the traffic, higher data rates will require shorter switch times and lower rate can accommodate longer switch times.

It should be noted that there are two reference sources are illustrated in configuration 800. It is understood that only one reference source may be used in conjunction with a switch or an optical splitter to multiplex the reference signal between the two paths. It can be appreciated to those skilled in the art that the configurations 600 and 700 may be employed as an optical block in the configuration 800 to utilize the features, advantages and benefits contemplated in the configurations 600 or 700.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

I claim:

1. A method for performing add/drop functioning, comprising:

adjusting a first tunable filter to a desired wavelength $\lambda_x$ by introducing a reference signal into a first circulator, wherein the reference signal is reflected by the first tunable filter to be dropped from the first circulator to determine a control signal most suitably for the first tunable filter; and scanning a second tunable filter to the desired wavelength $\lambda_x$ with a signal having K wavelengths $\lambda_1\lambda_2\lambda_3 \ldots \lambda_{x-1}\lambda_x\lambda_{x+1} \ldots \lambda_K$, wherein the wavelengths $\lambda_1\lambda_2\lambda_3 \ldots \lambda_{x-1}$ are reflected by the second tunable filter before the second tunable filter is turned to the desired wavelength $\lambda_x$, and the wavelengths $\lambda_{x+1} \ldots \lambda_K$ pass through the second tunable filter after the second tunable fitter is turned to the desired wavelength $\lambda_x$;

wherein a first optical path includes the first tunable filter and a second optical path includes the second tunable filter, both of the first and second optical paths are coupled to tho first circulator such that the wavelengths $\lambda_1\lambda_2\lambda_3 \ldots \lambda_{x-1}$ transmit through the first optical path and the wavelengths $\lambda_{+1} \ldots \lambda_K$ transmit through the second optical path.

2. The method of claim 1, wherein the adjusting of the first tunable filter comprises:

tapping a small portion off the dropped signal from the first circulator; and maximizing the dropped signal by iteratively adjusting the control signal for the first tunable filter.

3. The method of claim 1, wherein the scanning of the second tunable filter to the desired wavelength $\lambda_x$ comprises:

coupling the wavelengths $\lambda_1\lambda_2\lambda_3 \ldots \lambda_{x-1}$ to the first circulator, wherein the wavelengths $\lambda_1\lambda_2\lambda_3 \ldots \lambda_{x-1}$ transmit though the first tunable filter as the first tunable filter is tuned to the desired wavelength $\lambda_x$; and picking up at a second circulator a signal at desired wavelength $\lambda_x$ when the wavelengths $\lambda_1\lambda_2\lambda_3 \ldots \lambda_{x-1}$ pass through the second circulator, wherein the second circulator now outputs the wavelengths $\lambda_1\lambda_2\lambda_3 \ldots \lambda_{x-1}\lambda_x$.

4. The method of claim 3 further comprising combining the wavelengths $\lambda_1\lambda_2\lambda_3 \ldots \lambda_{x-1}\lambda_x$ wit the wavelengths $\lambda_{x+1} \ldots \lambda_K$ transmit from the second optical path to complete the add/drop functioning.

5. The method of claim 4, wherein the combining of the wavelengths $\lambda_1\lambda_2\lambda_3 \ldots \lambda_{x-1}\lambda_x$ with the wavelengths $\lambda_{x+1} \ldots \lambda_K$ is performed by a combiner.

6. The method of claim 5, wherein the combiner and the first circulator are respectively coupled to the first and second optical paths at two respective ends.

7. The method of claim 6, wherein respective optical lengths of the first and second optical paths are substantially similar.

8. The method of claim 1, wherein the reference signal wherein the reference signal is modulated by frequency modulation (FM).

9. The optical device of claim 8, wherein the FM modulated reference signal is further modulated by an amplitude modulation such that an electronic detection of a portion of the dropped signal from the first circulator can have a higher signal-to-noise ratio.

10. An optical device for add/drop functioning, comprising:
  a first and a second tunable filter;
  a first circulator and a second circulator;
  a combiner;
  wherein a first optical path begins with the first circulator, includes the first tunable filter and the second circulator, and ends with the combiner, a second optical path begins with the first circulator, includes the second tunable filter, and ends with the combiner;
  wherein, after the first tunable filter is tuned to a desired wavelength $\lambda_x$ and in scanning the second tunable filter for the desired wavelength $\lambda_x$, a first part of an optical signal received at the first circulator goes through the first optical path and a second part of the optical signal goes through the second optical path, the optical signal includes K wavelength $\lambda_1\lambda_2\lambda_3 \ldots \lambda_{x-1}\lambda_x\lambda_{x+1} \ldots \lambda_K$, wherein the first part of the optical signal includes wavelengths $\lambda_1\lambda_2\lambda_3 \ldots \lambda_{x-1}$ and the second part of the optical signal includes wavelengths $\lambda_{x+1} \ldots \lambda_K$, and after passing the second circulator, a wavelength $\lambda_x$ to be added is introduced into the second circulator, the wavelengths $\lambda_1\lambda_2\lambda_3 \ldots \lambda_{x-1}$ pick up the wavelength $\lambda_x$ produce the wavelengths $\lambda_1\lambda_2\lambda_3 \ldots \lambda_{x-1}\lambda_x$.

11. The optical device of claim 10, wherein the combiner receives the wavelengths $\lambda_1\lambda_2\lambda_3 \ldots \lambda_{x-1}\lambda_x$ is from the first optical path and the wavelengths $\lambda_{x+1} \ldots \lambda_K$ from the second optical path to complete the add/drop functioning.

12. The optical device of claim 10, wherein the first tunable filter is turned by introducing a reference signal into the first optical path, the reference signal is routed to the first tunable filter by the first circulator that subsequently drops the reference signal from a drop port of the first circulator.

13. The optical device of claim 12, wherein a control signal to the first tunable filter is adjusted or updated by a signal processor that determines the control signal in accordance with a sensed signal being maximized, the sensed signal from a detector is from a portion of the dropped reference signal from the first circulator.

14. The optical device of claim 10, wherein the optical signal includes K wavelengths $\lambda_1\lambda_2\lambda_3 \ldots \lambda_{x-1}\lambda_x\lambda_{x+1} \ldots \lambda_K$ the first part of the optical signal includes wavelengths $\lambda_1\lambda_2\lambda_3 \ldots \lambda_{x-1}$ and the second part of the optical signal includes wavelengths $\lambda_{x+1} \ldots \lambda_K$, and, wherein the first part of the optical signal is formed while the second tunable filter is being tuned from $\lambda_1$ towards $\lambda_x$.

15. The optical device of claim 14, wherein the first part of the optical signal is bounced back to the first circulator by the second tunable filter when the second tunable filter is so tuned.

16. The optical device of claim 16, wherein the second part of the optical signal is formed after the second tunable filter is tuned to the desired wavelength $\lambda_x$ and thus transmit through the second tunable filter.

17. The optical device of claim 10, wherein optical lengths of the first optical path and the second optical path are substantially similar.

* * * * *